United States Patent
Mohr

[15] 3,652,147
[45] Mar. 28, 1972

[54] PAPER CUTTING MACHINES

[72] Inventor: Rudolf Mohr, Hattersheimerstrasse 117-118, 6238 Hofheim, Taunus, Germany

[22] Filed: Sept. 4, 1970

[21] Appl. No.: 69,618

[30] Foreign Application Priority Data

Oct. 31, 1969 Germany..................P 19 54 816.4

[52] U.S. Cl..............................350/113, 33/1 L, 33/125 A, 350/116
[51] Int. Cl....................................G02b 27/18, G02b 27/32
[58] Field of Search..........................33/1 L, 125 A; 356/170; 350/110, 112, 113, 114, 115, 116

[56] References Cited

UNITED STATES PATENTS 2,043,625   6/1936   Lindner................................33/125 A Primary Examiner—Ronald L. Wibert
Assistant Examiner—Orville B. Chew, II
Attorney—Holman & Stern

[57] ABSTRACT

The guillotine saddle of a paper cutting machine is equipped with an optical viewing system projecting an image of the relevant portion of the machine table fine scale and of a contrast wedge alongside the machine table scale and having a taper coextensive therewith, on to a ground glass screen having a datum mark for scanning the machine table scale and a transverse coarse scale scribed thereon. The arrangement is such that when the saddle travels over the table, the image projected on the screen of the sloping edge of the contrast wedge scans the transverse coarse scale pari passu with the scanning of the fine scale moving under the datum mark.

4 Claims, 3 Drawing Figures

PAPER CUTTING MACHINES

The invention relates to paper cutting machines and more particularly to an optical measuring tape indicator device providing coarse and fine readings for such machines, which enables the operative to observe on a ground glass screen a clear and distinct view of the position of the feed saddle at each stage of the pattern of motion.

A measuring tape indicator providing coarse and fine readings for the stop position of the feed saddle has already been proposed, which furnishes a visible indication on a ground glass screen of the numerical values of the feed path of the saddle. To this end, the indicator disc is reduced to half speed by means of a belt drive, and its numerical values are then projected on to a ground or frosted glass screen.

The disadvantage of this known system consists in that the method of transmission does not allow of accurate readings or indications of the actual position of the saddle, since the intervening transmission members namely a web or belt, are the cause of changes in length engendered by temperature, mechanical or other actions and inevitably introduce sources of error into the system as a whole.

According to the present invention, the shortcomings of this known system are obviated by providing an optical measuring tape indicator device furnishing coarse and fine adjustment for paper cutting machines and having a ground glass screen on to which is projected the fine reading range scale of the ruler, said ground glass screen being moreover scribed with a scale of coarse fixed graduations arranged at right angles to the fine range scale and covering the entire range of said fine range scale, said coarse fixed scale being arranged to be scanned by relative motion between it and a contrast wedge mounted on the ruler, as hereinafter described. The arrangement is moreover such that a datum line on the ground glass screen gives the same indication of the saddle position on the fine range scale as it given on the scale for coarse readings by the contrast wedge.

The contrast wedge an image of which is projected on the ground glass screen is mounted on the fixed rule extending along the entire length of the machine table, in such manner that when the lens system passes over the rule, both the zone of the rule and the area of the contrast wedge involved at the time become visible on the ground glass screen, the fine scale of the rule being displayed on the ground glass screen in rapid sequence an exact reading of the saddle position being read off at a fixed datum on the ground glass screen, whereas the coarse reading is given by the relatively slow movement of the contrast wedge image along the fixed scale arranged transversely across the top of the ground glass screen. From the coarse reading, the operative can thus clearly determine both the position of the feed saddle and its direction of displacement.

In order more clearly to understand the invention, reference is made to the accompanying drawings, which illustrate diagrammatically and by way of example one embodiment thereof and in which.

Figure 1:
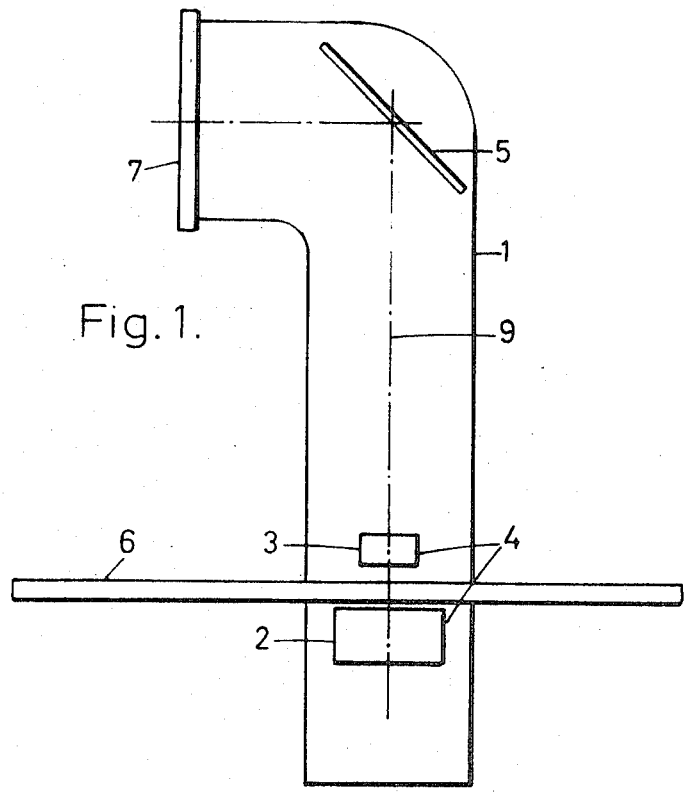
FIG. 1 is a side elevation of the optical measuring tape indicator device.

The optical measuring tape indicator device 1 of the feed saddle, (not illustrated) is shown in diagrammatical layout in FIG. 1. The optical measuring tape indicator device 1 comprises the optical system 4 consisting of the two lenses 2,3 and the mirror 5. The measuring tape 6 which extends along the entire length of the rear machine table, (not illustrated) has the optical system 4 travelling over it so that depending on the degree of magnification, enlarged images of the graduations 8 of the measuring tape 6 become visible on the ground glass screen 7. For this purpose mirror 5 reflects the image of the measuring tape 6 with the graduations 8 and the contrast wedge 10 on to the ground glass screen 7.

Figure 3:
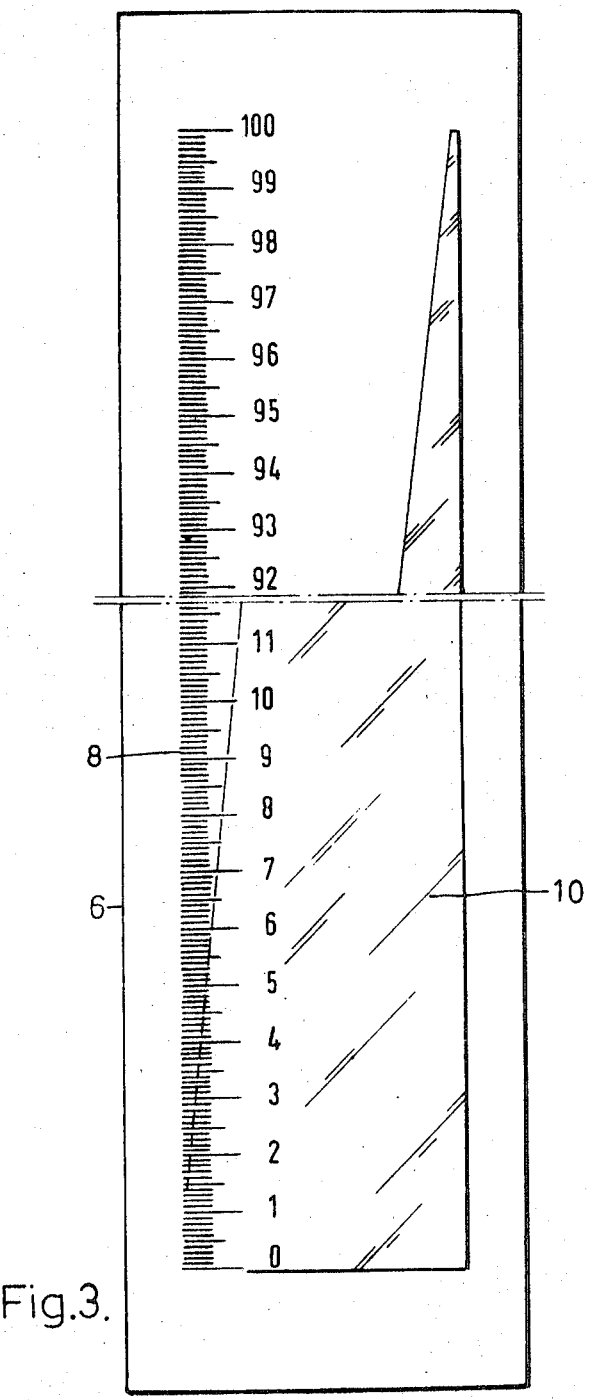
FIG. 3 shows the rule with the contrast wedge.

The rule 6 shown in FIG. 3 is provided with the contrast wedge 10 as well as the scale. If the working length of the cutting machine is 100 cm. for example, which corresponds to the graduation 0 – 100, the contrast wedge 10 is positioned along side this scale in such manner that it tapers down uniformly from the zero graduation to the hundred graduation line.

Figure 2:
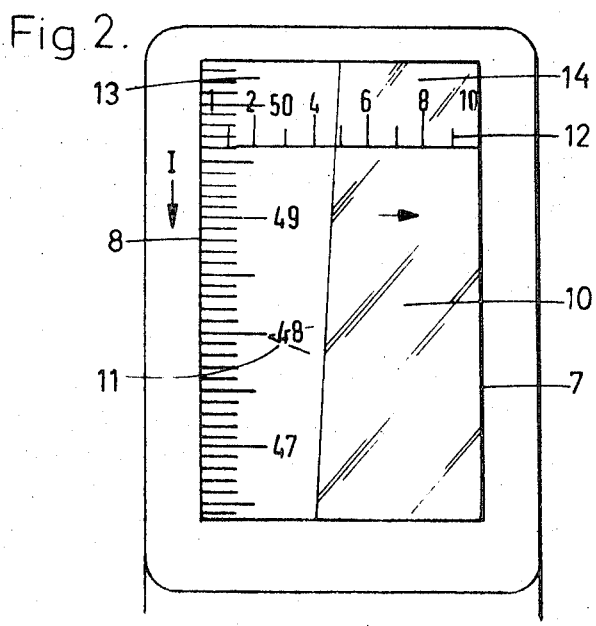
FIG. 2 is an enlarged view of the ground glass screen of the indicator device.

If the optical system 4 is then displaced over the measuring tape 6 it and the contrast wedge 10 become visible on the ground glass screen 7, as illustrated in FIG. 2.

The illustration of FIG. 2 depicts the position of the saddle at which the latter has traversed a path of 48 cm. from its zero position. This position can be read off at the datum mark 11 scribed on the ground glass screen.

The image of the sloping edge of the contrast wedge is simultaneously displaced along the scale 12 which also covers the entire working length of 0 – 100, so that - like the datum mark 11 - it indicates the value 48 on the scale 12. To ensure a definite and clearly visible reading, the scale 12 has a contrasting tint to that of the measuring tape 6 visible on the ground glass screen 7. The contrast wedge like wise has a tint contrasting to that of the ground glass screen so that the portion 13 on the scale 12 which indicates the travel path already described by the saddle appears brighter than the part 14 of the scale 12 which indicates the remainder of the travel path.

The scale 12 is fixed to the ground glass screen. In relation to the optical system the measuring tape 6 moves relatively quickly in the direction of the arrow I during the advance of the saddle, whereas the contrast wedge 10 moves gradually along the scale 12 in the direction of the arrow II. Consequently, while the operative cannot distinguish the graduations 8 of the measuring tape 6, the portion 13 which appears in a lighter shade on the scale 12 and indicates either the distance travelled or the saddle position is adequately visible on the scale 12 along which the image of the contrast wedge 10 moves but slowly in the direction of the arrow II, so that the operative can easily supervise the entire sequence of feed in each stage.

I claim:

1. A measuring tape indicator device providing coarse and fine readings for paper cutting machines, comprising an optical system fast with a saddle travelling over the machine table and arranged to view a measuring rule having fine graduations extending along said table, a contrast wedge secured to the surface of said table alongside said rule, the taper of said wedge being coextensive with said rule, said optical system having a ground glass viewing screen transversely scribed with a scale of coarse graduations corresponding to the fine graduations on said rule, the image of the tapering edge of said wedge when projected on to said ground glass screen acting as a cursor scanning said transverse coarse graduation with the scanning of the fine graduations by a datum mark on said screen.

2. A measuring tape indicator device providing coarse and fine readings for paper cutting machines, comprising an optical system fast with a saddle travelling over the machine table and arranged to view a measuring rule having fine graduations extending along said table, a contrast wedge secured to the surface of said table alongside said rule, the taper of said wedge being coextensive with said rule, said optical system having a ground glass viewing screen transversely scribed with a scale of coarse graduations corresponding to the fine graduations on said rule, the image of the tapering edge of said wedge when projected on to said ground glass screen acting as a cursor scanning said transverse coarse graduations with the scanning of the fine graduations by a datum mark on said screen, the ratio of the linear scanning speed of the datum mark to that of the tapering edge of the contrast wedge being preferably 10:1.

3. A measuring tape indicator device providing coarse and fine readings for paper cutting machines, comprising an optical system fast with a saddle travelling over the machine table and arranged to view a measuring rule having fine graduations extending along said table, a contrast wedge secured to the surface of said table alongside said rule, the taper of said wedge being coextensive with said rule, said optical system having a ground glass viewing screen transversely scribed with a scale of coarse graduations corresponding to the fine graduations of said rule, the contrast wedge and transversely scribed screen being of a shade contrasting with that of the ground glass screen, the image of the tapering edge of said wedge when projected on to said ground glass screen acting as a cursor scanning said transverse coarse graduations with the scanning of the fine graduations by a datum mark on said screen.

4. A measuring tape indicator device as claimed in claim 1, in which the image of the fine graduations and contrast wedge are reflected through 90° before projection on the ground glass screen.

* * * * *